United States Patent [19]

Castro, Jr.

[11] 4,172,874
[45] Oct. 30, 1979

[54] FILAMENT CURLING METHOD

[75] Inventor: Toribio Castro, Jr., New York, N.Y.

[73] Assignee: A & B Artistic Wig Corp., Long Island City, N.Y.

[21] Appl. No.: 933,444

[22] Filed: Aug. 14, 1978

Related U.S. Application Data

[63] Continuation of Ser. No. 733,012, Oct. 15, 1976, abandoned.

[51] Int. Cl.² ............................................. B29C 17/02
[52] U.S. Cl. ................................. 264/281; 264/339; 264/346; 264/DIG. 40
[58] Field of Search ....... 264/282, 281, 295, DIG. 40, 264/339; 425/384, 391

[56] References Cited

U.S. PATENT DOCUMENTS

| | | | |
|---|---|---|---|
| 2,980,959 | 4/1961 | Genovese | 264/281 |
| 3,342,026 | 9/1967 | Nichols | 425/384 |
| 3,363,041 | 1/1968 | Schickman et al. | 264/282 |
| 3,849,529 | 11/1974 | Ferment et al. | 264/85 |

*Primary Examiner*—James B. Lowe
*Attorney, Agent, or Firm*—Amster, Rothstein & Engelberg

[57] ABSTRACT

A method for curling plastic filaments to produce simulated hair for doll wigs in which the curled plastic filaments are given a permanent set by a heat treatment, in a chamber with a combination of steam and electrical heat. By the use of this combination of heat, melting of the filaments on the mandrel during interruption of the method is avoided.

4 Claims, 3 Drawing Figures

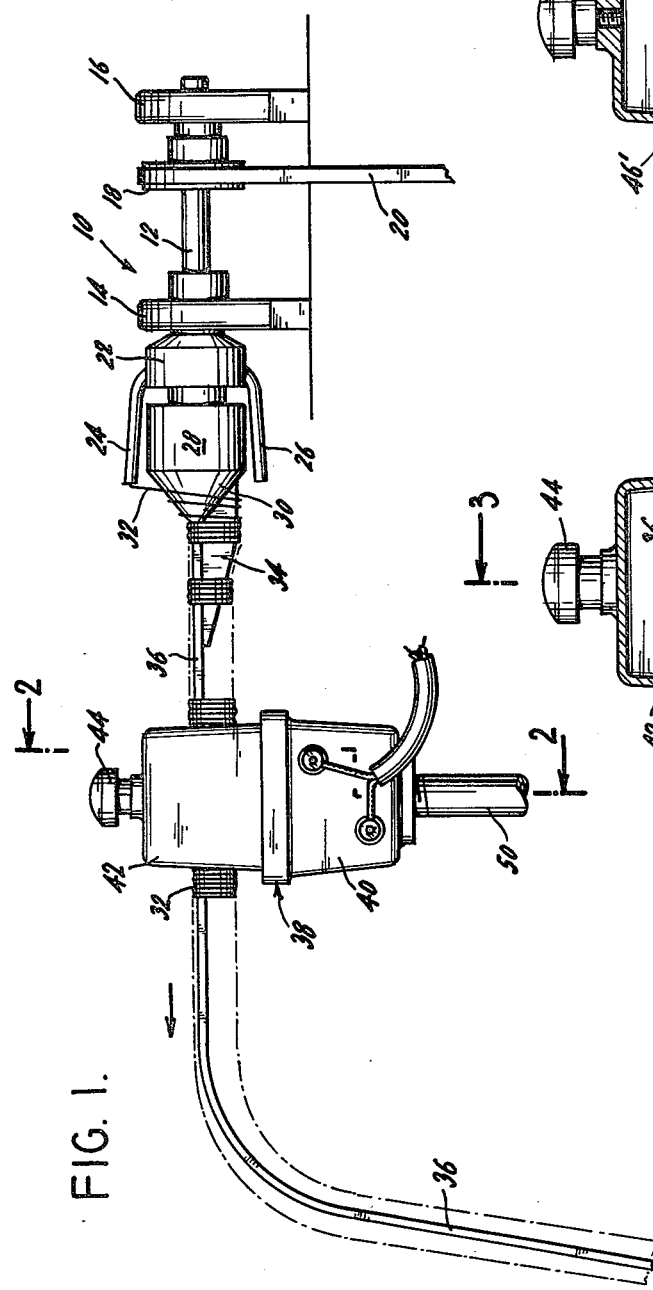
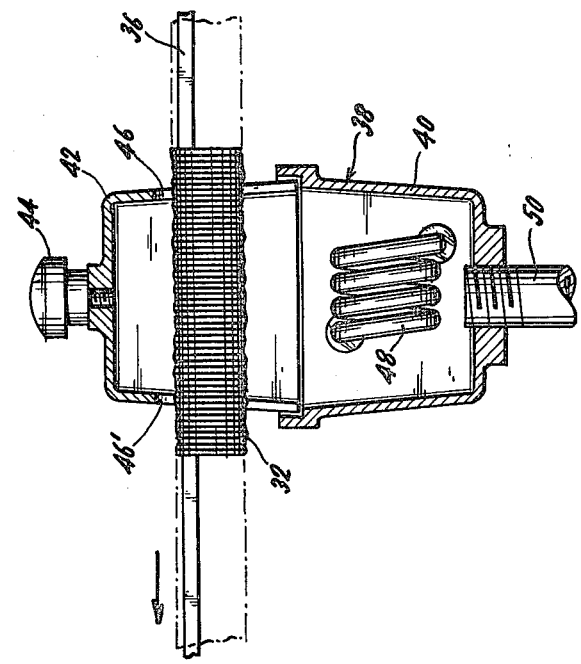
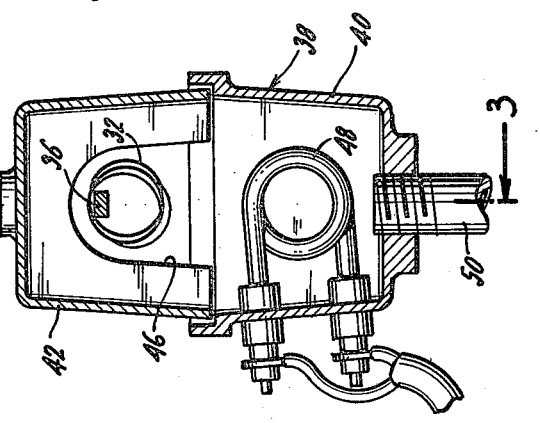
FIG. 1.
FIG. 2.
FIG. 3.

FILAMENT CURLING METHOD

This is a continuation of application Ser. No. 733,012 filed Oct. 15, 1976, now abandoned.

The present invention relates generally to an improved method for continuously curling yarns, threads and similar filaments which are normally employed in the manufacture of doll wigs or hairpieces.

Methods and apparatus for curling plastic filaments to produce curled plastic yarn suitable for use in the manufacture of doll wigs are generally well-known in the art. For example, U.S. Pat. No. 2,878,514 illustrates a typical method and apparatus for that purpose, in which plastic filaments are curled around a stationary mandrel by means of a rotating spinner which feeds the filaments to and along the mandrel and in which the filaments are given a permanent set, while on the mandrel, by means of some form of heat or fluid treatment. U.S. Pat. Nos. 2,929,179; 2,980,959; and 3,147,578 are additional examples of such curling methods and apparatus in which a heat treatment, steam treatment or the like is employed to impart the permanent set to the curled filament.

Over the years, various plastic materials have been employed for making curled doll hair. When water-absorbing materials such as acetates were employed, a permanent set or curl was readily imparted to the filaments in a steam chamber. More recently, non-water absorptive materials such as polyolefins, and particularly polypropylene, have become the material of choice for doll wig fibers because of the lower cost of these materials. Polypropylene is not readily settable with steam, and accordingly, prior to the present invention, it was common practice among those skilled in the art to pass the curled polypropylene filaments through a chamber containing an electrically heated coil in order to soften the filament sufficiently to impart the required set. Although this technique can produce an effective curl to the polypropylene filament, there are a number of practical problems in its use. Most notably, the residence time of the polypropylene fiber in the electrically heated chamber is critical and, as a result, such wig-curling apparatus requires constant and careful monitoring. Any snag in the movement of the filament along the length of the mandrel will result in an excessive residence time of the filaments within the electrically heated chamber, thereby causing the filaments to melt on the mandrel. Such melting not only results in a waste of material but, more importantly, in lost productivity since operation of the apparatus must be discontinued and the apparatus must be cooled down so that it may be fully cleaned and restored to an operative condition. Moreover, with such an arrangement, whenever the apparatus is shut-down for any purpose, there is a strong likelihood of melting the filaments on the mandrel due to the residual heat build-up on the mandrel.

It is an object of the present invention to provide an improved method for the production of curled plastic filaments.

A further and specific object of the invention is to provide an improved method for imparting a permanent set or curl to filaments formed on curling machines of the type heretofore described which eliminates the melting and clean-up problems associated with current commercial methods of curling such filaments.

The above objects of the invention are accomplished by providing a curling device of the type generally described in U.S. Pat. No. 2,878,514 with a treating chamber for imparting a permanent set to the curled filaments in which heat from a combination of an electrical heating element and steam provides the heat necessary to set the curl. It has been unexpectedly discovered that this combination results in the production of permanently curled filaments which cannot be produced with either heat source alone without incurring the operational difficulties, such as critical residence time and melting, as heretofore described.

The above brief description of the invention will be more fully appreciated by reference to the following detailed description, when taken in conjunction with the accompanying drawings wherein:

FIG. 1 is a side elevational view of a curling apparatus for continuously curling plastic yarn;

FIG. 2 is a sectional view of the heating chamber of the curling apparatus, taken along the line 2—2 of FIG. 1; and FIG. 3 is a sectional view of the heating chamber, taken along the line 3—3 of FIG. 2.

Referring to the drawings in detail, and particularly to FIG. 1, a curling machine embodying the features of the present invention is generally designated by the reference numeral 10 and comprises a hollow horizontally-disposed shaft 12 between spaced support brackets 14 and 16. Pulley 18 is fixedly-mounted on shaft 12 and is adapted to have a drive belt 20 run thereover, for rotating the pulley and the shaft. Collar 22 is fixedly-mounted on shaft 12 and contains an aperture (not shown) which communicates with an opening in shaft 12 (not shown) so as to permit plastic yarn to be fed from a storage spool, through the registered apertures, to spinner members 24 and 26 which extend outwardly from collar 22. A non-rotating member 28, having a conically tapered end portion 30, is mounted adjacent to collar 22 and is positioned to receive the curled plastic filaments 32 emanating from spinner members 24 or 26. A rib member 34 extends from conical surface 30 and beneath mandrel 36.

In operation, plastic filament is fed through hollow shaft 12 and collar 22, to spinners 24 or 26. The filaments exiting from spinner members 24 or 26 are helically wound around conical face 30, of fixed member 28, and guided by rib member 34 along mandrel 36. The curled filaments are self-feeding in a direction longitudinal to mandrel 36 (which may be angled slightly downward), and no external feeding means is necessarily required. The curled filaments, after treatment in chamber 38 to impart a permanent set to the curl, as will be described in more detail hereinafter, slide off mandrel 36 into a collection bag or other storage device (not shown).

A permanent set is imparted to the filaments by heat treatment in chamber 38. Chamber 38 consists of a base member 40 and a removable cover member 42 which is fitted with a handle or knob means 44. Cover member 42 is also provided with registered openings 46, 46' on respective opposite sides thereof which permit the passage of mandrel 36, containing curled filaments 32 thereon, into, through and out of chamber 38. Chamber base member 40 houses an electrical heating coil 48 and is connected through pipe 50 to a steam source (not shown).

In operation, heating coil 48 is energized and its output is controlled by a conventional thermostatic control device. Steam from a suitable source at the appropriate temperature, as will be further described, is fed into chamber 38 through steam pipe 50, passes over heating coil 48 and exits through openings 46, 46'. The continuous operation of curling machine 10 causes curled fibers 32 to be self-fed into chamber 38, through opening 46 and out of chamber 38, through opening 46'. During this residence time in chamber 38, a permanent set is imparted to the curled filaments.

The operating conditions in the heating chamber are, of course, dependent on the physical properties of the plastic filaments being curled. In order to impart a permanent curl to a particular type of plastic filament by means of a heat treatment, the filament must reach a temperature above its plastic deformation or elastic memory point, but below the temperature at which the filament will flow or melt. It will be apparent to those skilled in the art, that when an electrical heating coil is employed in an open heating chamber such as chamber 38, the coil temperature will normally be well in excess of both the desired filament curling temperature and the filament melting point; since, otherwise, the filaments could not reach their plastic deformation point in the limited exposure time as they move through the heating chamber. Under these conditions, it will be apparent that the atmospheric temperature in the heating chamber 38 and the surface temperature of that portion of the mandrel within heating chamber 38 will normally exceed the melting point of the curled plastic filaments. Accordingly, the residence time of the filaments within heating chamber 38 is critical and any snag or stoppage in the operation of the curling machine 10 which slows down or stops the movement of the curled filaments through the heating chamber will shrink and/or melt the filaments, thereby requiring a complete shut-down and clean-up of the operation before it can be re-started.

It is presently believed that the utilization of steam in the heating chamber in combination with the electrical heating coil, operating in the manner previously described, acts as both an efficient heat-transfer medium and as a temperature control for the heating chamber. Accordingly, the combination of the steam and the heat generated by the coil is normally capable of providing a permanent curl to the plastic filaments in a period of 1 to 10 seconds, preferably 3 to 5 seconds. Surprisingly, however, the curled filaments may remain in the heating chamber for extended time periods without melting or fouling the mandrel and associated apparatus, thereby indicating that the atmospheric temperature in the heating chamber and the surface temperature of that portion of the mandrel within the heating chamber does not exceed the melting point of the plastic filaments.

The temperature at which the steam is introduced into the heating chamber is not critical and is dependent upon the heat output from the electrical heating coil; the amount of steam employed; and the melting point of the particular plastic filament being curled. The steam will, of course, be introduced at a temperature below the melting point of the plastic filament being curled and, preferably, below the plastic deformation temperature of the particular filament being curled. Accordingly, the heat added to the steam containing chamber by the electrical heating coil will be sufficient to raise the steam temperature (and thus the atmospheric temperature of the chamber) above the plastic deformation temperature of the plastic filament but insufficient to raise the atmospheric temperature within the chamber and the mandrel temperature above the flow or melting point of the plastic filaments being curled and set. Typically, the steam will be introduced at temperatures in the range of 200° F. to 220° F., preferably 212° F., and at flow rates of 1 to 3 lbs./min., preferably 1.5 to 2 lbs./min. These conditions will, of course, vary with the melting point of the plastic and the level of output from the heating coil.

The invention will be further understood by reference to the following illustrative and comparative examples.

The apparatus heretofore described was operated to produce curled polypropylene filaments. No steam was employed in the heating chamber and the heating coil was set at a temperature of approximately 500° F. in order to provide an atmospheric temperature in the chamber of between 320° to 330° F. Under the foregoing conditions, the polypropylene filaments did not provide a permanently set curl after a 5 second exposure in the heating chamber. After 15 seconds of exposure, the polypropylene filaments shrank and, after a 30 second exposure, the filaments melted on the mandrel. This example illustrates that the use of an electrical heating coil creates a critical residence time within the heating chamber and that the filaments must move through the chamber within a period of 5 to 15 seconds in order to produce a curled filament, without shrinking or melting.

A second experiment was conducted in which the curling machine 10 was operated to produce curled polypropylene filaments, wherein the heating chamber was operated with steam, alone, at a temperature of 212° F. and a pressure of 2 psig. The polypropylene filaments did not retain a curl after a 30 minute treatment with the steam and, in addition, the filaments became too wet for further handling.

A third experiment was conducted in which the curling machine 10 was operated to produce curled polypropylene filaments utilizing a combination of an electric heating coil, operating at approximately 500° F., and steam at a temperature of 212° F. and a pressure of 3 psig. The temperature of the atmosphere in the heating chamber under these conditions was capable of being maintained at a temperature of 315° F. to 325° F. A permanent curled set was given to the polypropylene filaments as a result of a 5 second treatment within the heating chamber. Moreover, the polypropylene filaments did not melt, even when they were retained in the heating chamber for a period of time in excess of 1 hour.

What is claimed is:

1. In the method for producing curled plastic filament in which said plastic filaments are helically wound around a mandrel to curl the filaments and are thereafter moved along the mandrel through a heat-treating chamber to permanently set the curl, the improvement comprising heat-treating said plastic filaments while wound around the mandrel in the heating chamber with a combination of steam and heat derived from an electric heating coil, said heating coil being maintained at a temperature above the melting point of said plastic filaments whereby if said heating coil were used alone, the heat from said heating coil would cause the surface of said mandrel to reach a temperature above the melting point of said plastic filaments during extended residence time in said heating chamber, said steam being introduced into said chamber at a temperature below the melting point of said plastic filaments, so that the combination of the heat generated by said coil and said steam result in an atmospheric temperature in said heating chamber above the plastic deformation temperature of said filaments and below the melting point of said filaments which is sufficient to permanently set the curled filaments moving through the heating chamber but is insufficient to melt said filament, and in a surface temperature on said mandrel below the melting point of said filaments whereby extended residence time in said heating chamber will not cause said plastic filaments to become melted on to said mandrel thereby avoiding the necessity for clean-up if said method is interrupted.

2. The method of claim 1 in which the residence time of said filaments within said heating chamber is one to ten seconds during non-interrupted operation of said method.

3. The method of claim 1, wherein said plastic filaments are polypropylene filaments.

4. The method of claim 3, wherein said steam is introduced into said heating chamber at a temperature of approximately 212° F., the heating coil is maintained at the temperature above the melting point of said polypropylene filaments and the resulting atmospheric temperature in said chamber is in the range of approximately 315° to 325° F.

* * * * *